United States Patent [19]

Saito

[11] Patent Number: 5,740,246
[45] Date of Patent: Apr. 14, 1998

[54] CRYPT KEY SYSTEM

[75] Inventor: Makoto Saito, Tokyo, Japan

[73] Assignee: Mitsubishi Corporation, Tokyo, Japan

[21] Appl. No.: 573,958

[22] Filed: Dec. 13, 1995

[30] Foreign Application Priority Data

Dec. 13, 1994 [JP] Japan .................................. 6-309292

[51] Int. Cl.$^6$ .............................. H04N 7/167; H04L 9/30
[52] U.S. Cl. ........................... 380/21; 380/20; 380/30
[58] Field of Search ............................ 380/10, 20, 21, 380/30, 4, 5

[56] References Cited

U.S. PATENT DOCUMENTS

| | | | |
|---|---|---|---|
| 5,142,579 | 8/1992 | Anderson | 380/30 |
| 5,400,403 | 3/1995 | Fahn et al. | 380/21 |
| 5,442,706 | 8/1995 | Kung | 380/30 |
| 5,504,933 | 4/1996 | Saito | 455/2 |

FOREIGN PATENT DOCUMENTS

| | | |
|---|---|---|
| 0438154 | 7/1991 | European Pat. Off. . |
| 0450841 | 10/1991 | European Pat. Off. . |
| 0506435 | 9/1992 | European Pat. Off. . |

OTHER PUBLICATIONS

Vigarié, JeaPierre "A device for real-time modification of access conditions in D2-MAC/ Pakedt EUROCRYPT signal: The Transcontroller," 18th International Television Symposium and Technical Exhibition, Montreux, Switzerland, Jun. 10-15, 1993, pp. 761-768.

*Primary Examiner*—Gilberto Barron, Jr.
*Attorney, Agent, or Firm*—Hecker & Harriman

[57] ABSTRACT

The present invention provides a concrete structure for applying a crypt key system to a television system, a database system or an electronic commercial transaction system or the like. This system consists of a broadcasting station, a database, a receiving apparatus, a data communication apparatus and a user terminal. As a crypt key system, a secret-key cryptosystem, a public-key cryptosystem, and a digital signature system are used. The keys used in the system are either encrypted or remain uncrypted to be supplied by broadcasting. The present invention is effective in preventing an unjustified use of the database system, managing copyrights, and in a pay-per-view system and a video-on-demand system. Further, the present invention is effective in realizing an electronic market which uses an electronic data information system.

16 Claims, 5 Drawing Sheets

ELECTRONIC MARKET

FIG. 5(b)

ELECTRONIC MARKET

FIG. 5(c)

ELECTRONIC MARKET

CRYPT KEY SYSTEM

BACKGROUND OF THE INVENTION

1. Field of the Invention

The present invention relates to a crypt key system applicable to commercial trade or the like which uses a television system, a database system or an electronic data interchange.

2. Background Art

In the information-oriented society of today, besides normal terrestrial broadcasting, satellite broadcasting, which is referred to as broadcasting satellites (BS) and communication satellites (CS), and cable TV broadcasting, which is referred to as CATV (cable television), using coaxial cables or optical cables are gaining wide spread acceptance.

In a satellite broadcasting or CATV broadcasting which distributes several tens of channels at the same time, scrambled channels of movies, sport events, and music which cannot be viewed through a comprehensive contract are provided in addition to unscrambled general channels. In order to view these scrambled channels, it is necessary to subscribe to descramble the channels; however, a normal subscription period is about one month, and it is often impossible to view through temporary contracts of shorter duration.

The inventor of the present invention proposed, in the Japanese Patent Application Laid-Open No. 6-46419 and the Japanese Patent Application Laid-Open No. 6-141004, a system in which users obtain a viewing permit key from a charging center via a communication line and are charged, and descramble programs scrambled each by a different scramble pattern, using the viewing permit key to view the programs, and proposed in the Japanese Patent Application Laid-Open No. 6-132916 an apparatus for the operation.

In these system and apparatus, those who wish to use scrambled programs send a request for viewing to the charging center via a communication line by using a communication apparatus. The charging center transmits the viewing permit key to the communication apparatus corresponding to the request for viewing while charging and collecting a fee.

Users, on receiving the viewing permit key with the communication apparatus, transmit the viewing permit key via direct means connecting the communication apparatus and the receiving apparatus or via indirect means such as flexible disks or the like. The receiving apparatus to which the viewing permit key is transmitted descrambles the programs with the viewing permit key and then, the users use the programs.

Japanese Patent Application Laid-Open No. 6-132916 describes a system and an apparatus for selling and renting of a tape or a disk on which a plurality of data scrambled with different scramble patterns respectively are recorded to supply the viewing permit key with IC cards or the like and use specific data.

In addition, in today's information-oriented society, a database system has become available for mutually using data which are kept independently by each computer by constituting a computer communication network by LAN (local area network), WAN (wide area network), and Inter-Net system mutually connecting these networks.

In the meantime, a technology has been developed for reducing the information amount by compressing a television moving picture signal which could not be digitized because of a huge amount of information as a result of digitization, to enable practical digitalization. So far, H.261 standard for video conference, JPEG (joint photographic image coding experts group) standard for static pictures, MPEG 1 (moving picture image coding experts group 1) standard for storing pictures and MPEG 2 corresponding to the present telecast and the high-definition telecast from the television broadcasting are available.

The digitization technology using these picture compression technology is used for the television broadcasting or the video picture recording. In addition, even television moving picture data which could not be dealt with before can be dealt with now. Then, the "multimedia system" which deals with various data dealt with by the computer and the digitized television moving picture data has attracted interest as a future technology. This multimedia system is also incorporated in the data communication and can be used as data on the database.

While the scope of usage of the database is expanded, the method for charging for the data use on the database, and the method for dealing with copyright problems generated by copying, transmitting other than direct use of data, and also the secondary exploitation right problem generated as a result of data edition have become important problems. To safely deal with charging and copyrights process, it is required that the data cannot be used by users other than authorized users, and data encryption is the best means for this purpose.

In addition, an electronic market system has been investigated for converting information in various kinds of transaction which has been carried out by paper documents so far, into electronic data to execute electronic transaction by using the electronic data interchange for transmitting and receiving data by the data communication technology. In addition, an investigation is also under way on the possibility of carrying out an electronic settlement on the electronic commercial transaction system.

In commercial transactions, reliability on the transaction details is required and security in the settlement is required. Consequently, in the electronic commercial transaction system and electronic settlement system in which such reliability and security are demanded, it is required that the data is encrypted so that the data will not be falsified or used unjustifiedly.

In these television systems, database systems or electronic commercial transaction systems or the like, the data is encrypted and thus a crypt key is required for decrypting the encrypted data. And the crypt key must be given to data users; however, the processing is very troublesome because security and reliability are demanded.

In the structure of the present invention, data cryptology plays an important part. In the following, a general explanation will be given on the data cryptology.

In the data cryptology, the case in which the plaintext data M is encrypted by using a crypt key K to obtain a cryptogram data C is represented by:

$$C = E(K, M),$$

and the case in which the cryptogram data C is decrypted by using the crypt key K to obtain the plaintext data M is represented by:

$$M = D(K, C).$$

As typical methods for the data cryptography technology, there are a secret-key cryptosystem and a public-key cryptosystem. The secret-key cryptosystem is a cryptosystem in which same secret key Ks is commonly used in encryption and decryption:

$$Cmks=E(Ks,M)$$

$$M=D(Ks,Cmks).$$

The public-key cryptosystem is a cryptosystem in which a key for encryption and a key for decryption are used as crypt keys, and the key for encryption is made public but the key for decryption is not made public. The key for encryption is referred to as a public-key Kb while the key for decryption is referred to as a private-key Kv. To use this cryptosystem, an information sender encrypts the plaintext data M by the pubic-key Kb of a receiver:

$$Cmbk=E(Kb,M),$$

and the receiver receives the data and decrypts it by a private-key Kv to obtain the plaintext data M $$M=D(Kv,C\ Cmkb).$$

In this public-key cryptosystem, cryptanalysis is very difficult.

As an application of the data cryptography technology, digital signature is performed as an electronic data authentication means to ensure the reliability of the data.

The digital signature is used with a secret-key or a public-key. Generally, the public-key is used in the digital signature.

In the digital signature which is carried out by using the public-key, the signer obtains a digital signature by encrypting a document m to which the document M is compressed with hash algorithm, using the private-key Kv of the signer:

$$Smkv=E(Kv,m)$$

and transmits the original document M or the compressed document m and the digital signature Smkv to the receiver.

The receiver decrypts the digital signature Smkv by using the public-key Kb of the signer $$m'=D(Kb,Smkv).$$

When m'=m is established, it is recognized that the signature is correct.

As a method for providing these crypt keys to users, the inventor of the present invention proposed an invention entitled "crypt key system" in the prior Japanese Patent Application No. 6-70643.

In the generally practiced crypt key system, the crypt key is provided only to users while the crypt key is provided to persons other than the users in the crypt key system of this prior invention.

Figure 1:
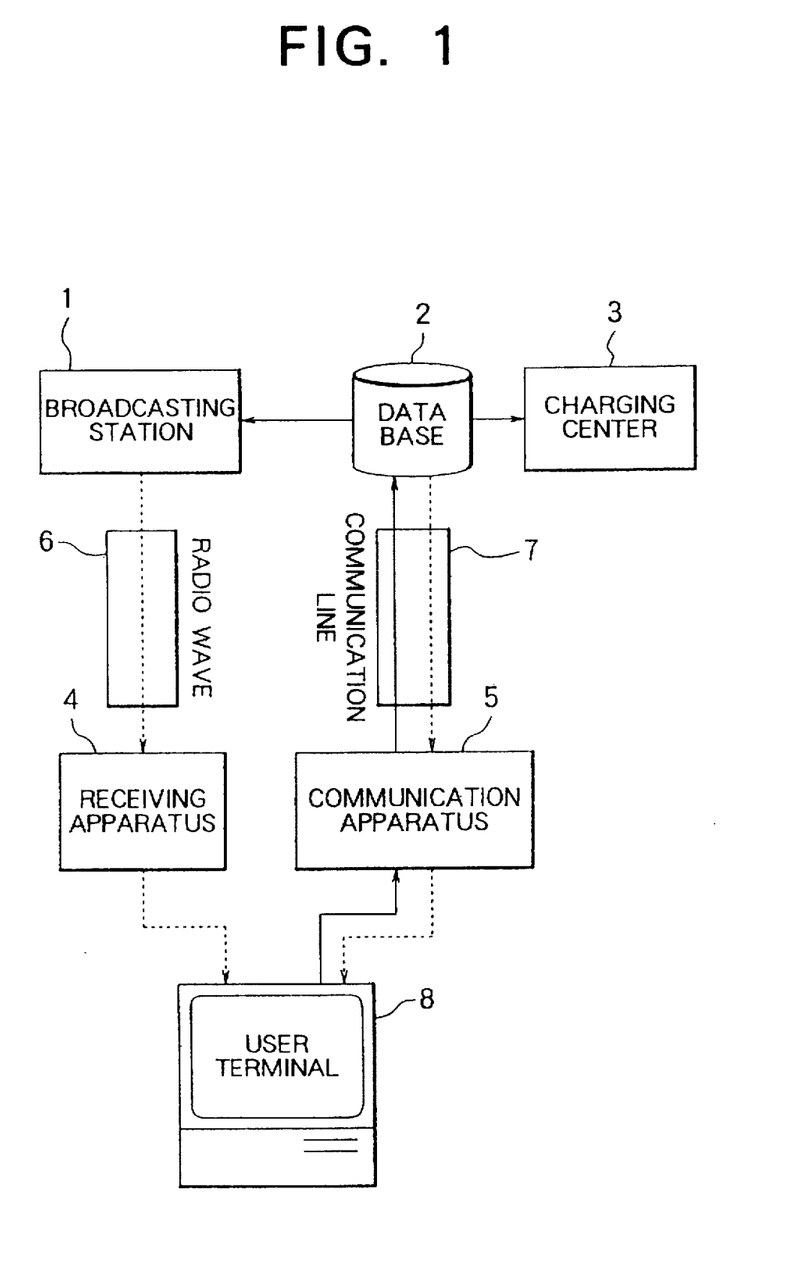
FIG. 1 is a block diagram of a crypt key system according to the prior applications.

FIG. 1 shows the structure of the crypt key system proposed in the Japanese Patent Application No. 6-70643.

This system comprises a broadcasting station 1 for multiplex broadcasting such as BS, CS, terrestrial broadcasting or FM (frequency modulation) or the like or data broadcasting, a database 2, a charging center 3, a receiving apparatus 4, data communication apparatus 5 and a user's terminal 8.

The broadcasting station 1 and the database 2, and the database 2 and the charging center 3 are connected to each other via a communication line such as a dedicated line or the like or a flexible disc or the like. The database 2 and the data communication apparatus 5 are connected by a communication line 7 such as a communication line or CATV (cable TV) line.

The broadcasting station 1 and the receiving apparatus 4 are connected with the broadcasting radio wave 6. The receiving apparatus 4 and the user terminal apparatus 8, and the data communication apparatus 5 and the user terminal 8 are connected with a direct means such as a connection cable or an indirect means such as a flexible disc.

In FIG. 1, what is shown with a solid line is a path of information which is not encrypted. What is shown with a broken line is a path of data which is encrypted.

In this system, the database 2 preliminarily supplies a permit key Kp (hereinafter referred to as a "permit key") including the crypt key Kd which is different from one data to another to the broadcasting station 1. The permit key Kp is explained in such a manner that the permit key Kp constitutes the crypt key Kd only for better understanding.

In some cases, the crypt key Kd is supplied without being encrypted, and in other cases, it is encrypted by using the common crypt key K0:

$$Ckdk0=E(K0,Kd),$$

and is supplied as an encrypted crypt key Ckdk0.

In the case where the crypt key Kd is encrypted and supplied, a common crypt key K0 for decrypting the encrypted crypt key Ckdk0 is supplied to users. This common crypt key K0 is supplied when users register with the database, or it is supplied to the users together with the encrypted data Cmkd when the encrypted data Cmkd is transmitted.

(a) In the case where the crypt key is not encrypted:

In this crypt key system, the broadcasting station 1 broadcasts the crypt key Kd supplied from the database 2, by using the radio wave 6. The receiving apparatus 4 supplies the received crypt key Kd to the user terminal 8 so that the user terminal 8 stores the received crypt key Kd in a recording medium such as a semiconductor memory, a flexible disc, a hard disc or the like.

The users who wish to use the data request for the use of the data M to the database 2 via the communication line 7 by using the data communication apparatus 5.

The database 2 which has received the request for use of the data M encrypts the data M by the crypt key Kd which is a permit key Kp:

$$Cmkd=(Kd,M),$$

and transmits the encrypted data Cmkd to the data communication apparatus 5 of users via the communication line 7 and charges with the charging center 3.

The data communication apparatus 5 supplies the received encrypted data Cmkd to the user terminal 8 while the user terminal 8 decrypts the encrypted data Cmkd by the crypt key Kd which is stored in the recording medium:

$$M=D(Kd,Cmkd).$$

(b) In the case where the crypt key is encrypted and the common crypt key is preliminarily distributed to users:

In this crypt key system, when users register to use the database, the common crypt key K0 is supplied to users with the recording medium such as ROM or flexible disc and the supplied common crypt key K0 is stored in the user terminal 8.

The database 2 encrypts the crypt key Kd by using the common crypt key K0:

$$Ckdk0=E(K0,Kd),$$

and supplies encrypted crypt key Ckdk0 to the broadcasting station 1.

The broadcasting station 1 broadcasts the received encrypted crypt key Ckdk0 supplied from database 2 by using the radio wave 6. The receiving apparatus 4 supplies the received encrypted crypt key Ckdk0 to the user terminal 8 which decrypts the encrypted crypt key Ckdk0 in the beginning by the preliminarily stored common crypt key K0:

$$Kd=D(K0,Ckdk0),$$

and stores the decrypted crypt key Kd in the recording medium such as a semiconductor memory, a flexible disc or a hard disc.

Users who wish to use the data requests for the use of the data M to the database 2 via the communication line 7 by using the data communication apparatus 5.

The database 2 which receives the request for the data use encrypts the data M which is demanded for use encrypts data M by the crypt key Kd:

$$Cmkd=E(Kd,M),$$

and transmits it to the data communication apparatus 5 via the communication line 7 and charges with the charging center 3.

The data communication apparatus 5 supplies the received encrypted data Cmkd to the user terminal 8 which decrypts the encrypted data Cmkd by the stored crypt key Kd:

$$M=D(Kd,Cmkd).$$

(c) In the case where the crypt key is encrypted and the common crypt key is distributed to the user together with the encrypted data:

In this crypt key system, the database 2 encrypt the crypt key Kd by the common crypt key K0:

$$Ckdk0=E(K0,Kd)$$

and supplies it to the broadcasting station 1.

The broadcasting station 1 broadcasts the encrypted crypt key Ckdk0 which has been supplied from the database 2, by using the radio wave 6. The receiving apparatus 4 supplies the received encrypted crypt key Ckdk0 to the user terminal 8. The user terminal 8 stores the encrypted crypt key Ckdk0 in recording medium such as a semiconductor memory, a flexible disc, or a hard disc or the like.

Users who wish to use the data request for the use of the data M to the database 2 via the communication line 7 by using the data communication apparatus 5.

The database 2 which receives the request for the data use encrypts the data M which is demanded for use by the crypt key Kd:

$$Cmkd=E(Kd,M),$$

and transmits it to the data communication apparatus 5 via the communication line 7 together with the common crypt key K0 and charges with the charging center 3.

The data communication apparatus 5 supplies the received encrypted data Cmkd and the common crypt key K0 to the user terminal 8. The user terminal 8 decrypts the encrypted crypt key Ckdk0 which has been stored in the recording medium by the common crypt key K0:

$$Kd=D(K0,Ckdk0),$$

and decrypts the encrypted data Cmkd by the decrypted crypt key Kd:

$$M=D(Kd,Cmkd).$$

SUMMARY OF THE INVENTION

The present invention provides a concrete structure for applying the invention of the crypt key system described in the previous applications to the television system, the database system or the electronic commercial transaction system or the like.

This system comprises a broadcasting station, a database, a receiving apparatus, a data communication apparatus, and a user terminal. As the crypt key system, secret-key cryptosystem and the public-key cryptosystem are used. In addition, the digital signature is used, and the crypt key is supplied through broadcasting with either encrypted or uncrypted.

The present invention is effective in preventing unjustified use or in copyright management in a database system, a pay-per-view system, or a video-on-demand system. Furthermore, the present invention is a useful means in the realization of an electronic market using the electronic data interchange system.

DETAILED DESCRIPTION OF THE INVENTION

The present invention is a crypt key system applicable to commercial trade or the like which uses a television system, a database system or an electronic data interchange. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

The cryptography system, in general, includes a secret-key cryptosystem and a public-key cryptosystem. The secret-key cryptosystem is a cryptosystem in which the same crypt key is used for encryption and decryption. Although this cryptosystem requires relatively shorter time for encryption or decryption, once the secret-key is known, the cryption can be cryptanalyzed.

The public-key cryptosystem is a cryptosystem which provides two keys: a key for encryption open to the public as a public-key and a key for decryption not open to the public. The key for encryption is referred to as a public key and the key for decryption is referred to as a private key. A party transferring information encrypts the information with a public-key of a receiving party and the receiving party decrypts the information with a private-key. While this cryptosystem requires relatively longer time for encryption or decryption, the private-key is hard to find and it is very difficult to cryptanalyze the cryption.

Figure 2:
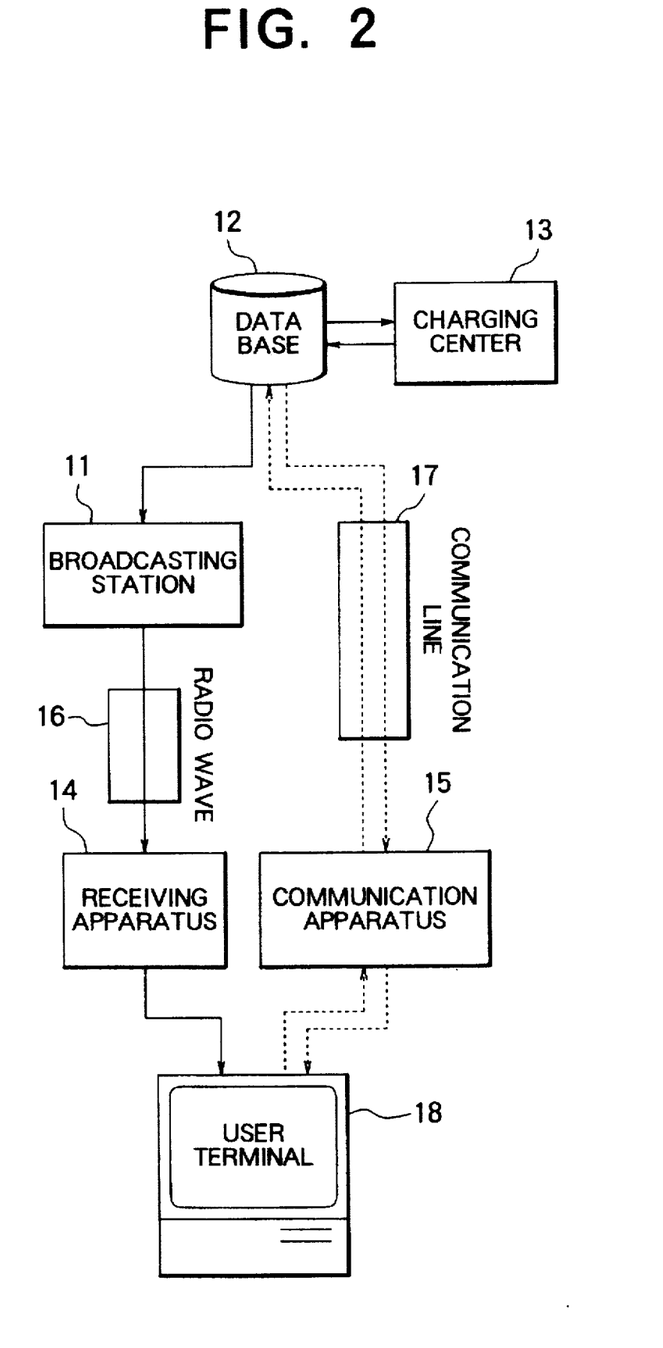
FIG. 2 is a block diagram of the crypt key system according to a first embodiment of the present invention.
Figure 3:
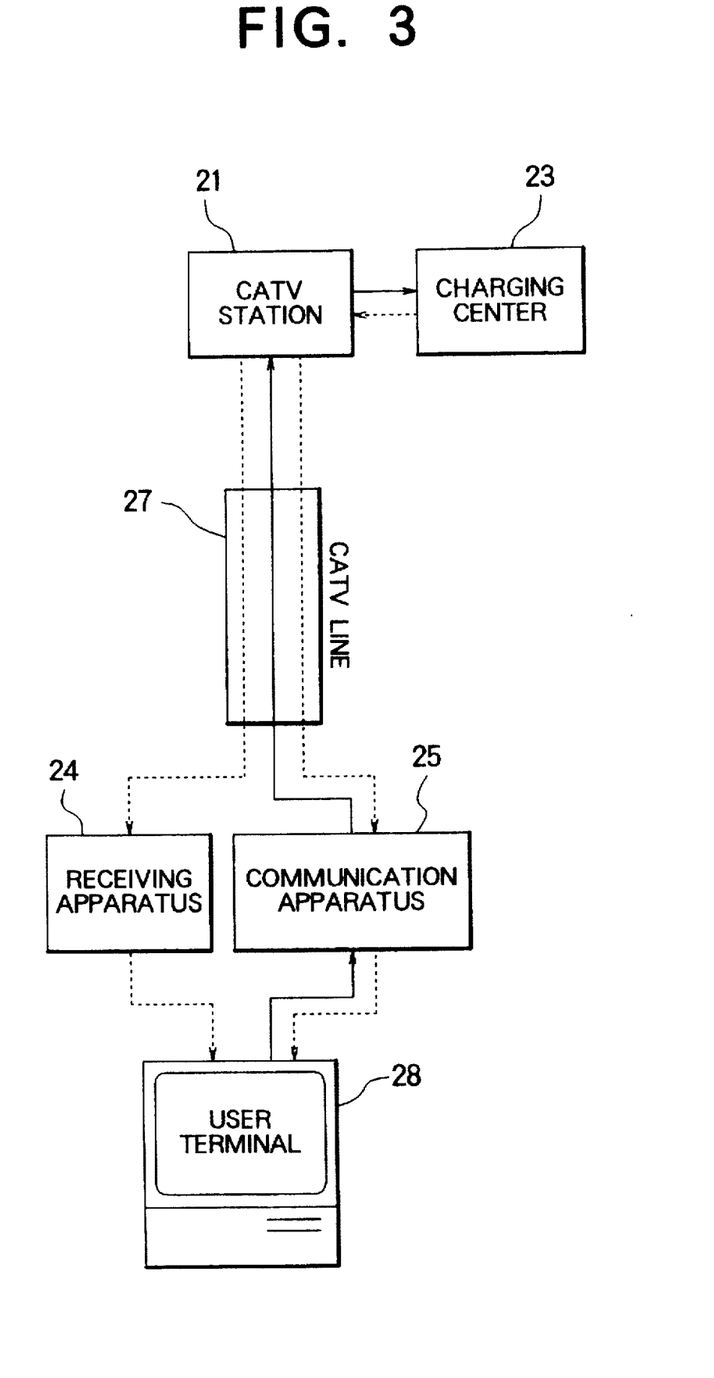
FIG. 3 is a block diagram of the crypt key system according to a second embodiment of the present invention.
Figure 4:
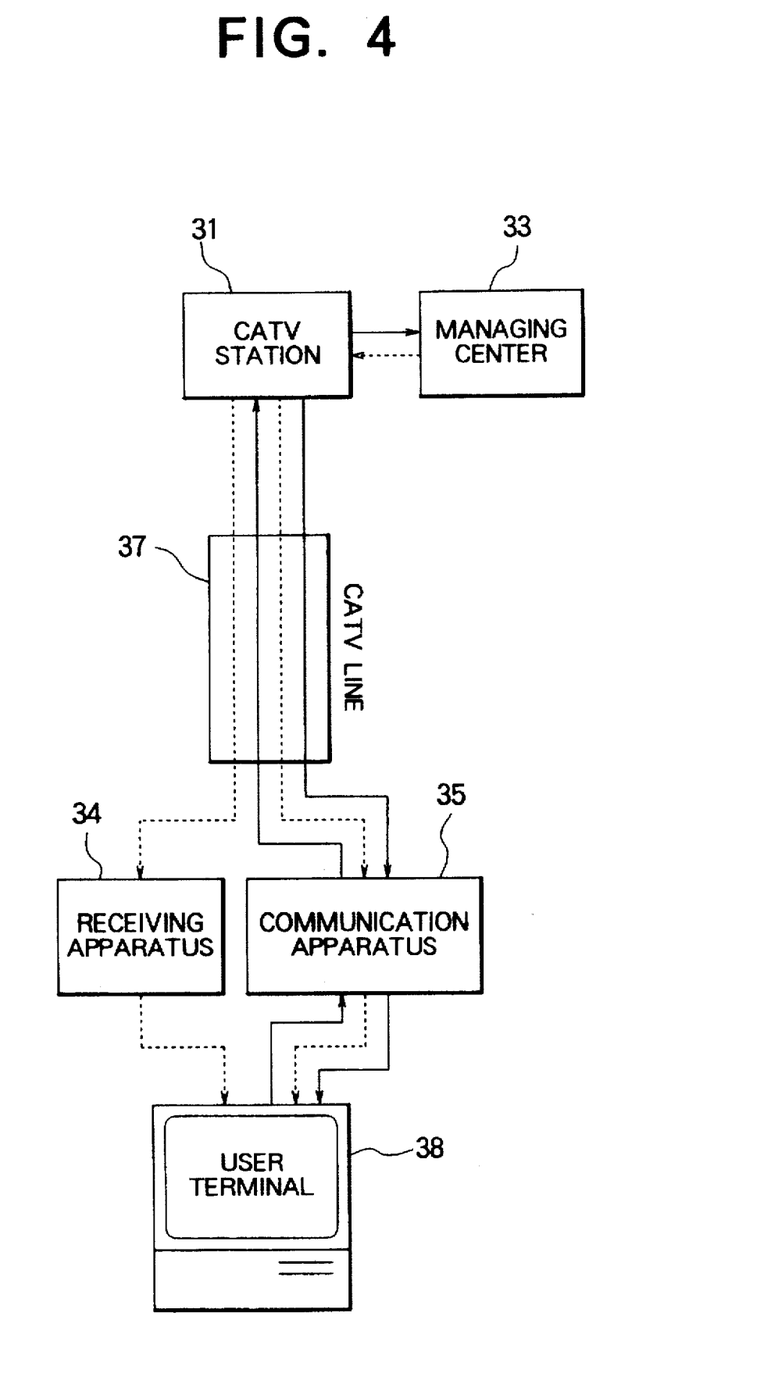
FIG. 4 is a block diagram of the crypt key system according to third and fourth embodiments of the present invention.

Embodiments of the present invention are now described by using FIGS. 2-4.

Embodiment 1

A system shown in FIG. 2 is a crypt key system of the embodiment 1 in which the present invention is applied to a database system. This system comprises a broadcasting station 11 which uses either a multiplex broadcasting by BS, CS, a terrestrial wave television, or FM broadcasting or the like, or data broadcasting by a digital broadcasting, a database 12 in which various kinds of data including moving picture data is stored, a charging center 13, a receiving apparatus 14 for receiving the data broadcast by the broadcasting station 11, a data communication apparatus 15 for communicating with the database 12 and the user terminal 18 for using the data.

The database 12 and the broadcasting station 11, and the database 12 and the charging center 13 are connected with a direct means for connecting with a communication line such as a dedicated line or an indirect means such as a flexible disc or the like. The database 12 and the data communication apparatus 5 are connected with a communication line 17 such as a communication line, or CATV line or the like. Then, the broadcasting station 11 and the receiving apparatus 14 are connected by radio wave 16 such as a terrestrial wave television broadcasting, satellite television broadcasting, CATV broadcasting, FM broadcasting or a satellite data broadcasting or the like. The receiving apparatus 14 and the user terminal 18, and the data communication apparatus 15 and the user terminal 18 are connected with a direct means such as a connection cable or an indirect means such as a flexible disc or the like.

What is shown with a solid line in FIG. 2 is an uncrypted data path and what is shown with a broken line is an encrypted data path.

Incidentally, data exchange between the database 12 and the broadcasting station 11, and the database 12 and the charging center 13 are, in principle, carried out with a dedicated line or a flexible disc. In addition, a public line, a broadcasting satellite, a communication satellite or a terrestrial wave broadcasting can be used. In such a case, the data is encrypted.

In this system, the secret-key cryptosystem and the public-key cryptosystem are used.

The database 12 prepares the public-key Kbd and the private-key Kvd to supply the public-key Kbd to the broadcasting station 11. The broadcasting station 11 which receives the public-key Kbd broadcasts it by a teletext multiplexing broadcasting using scanning lines during the retrace blanking interval period of an analog television picture signal, the data broadcasting using a sub audio band of the analog television audio signal, FM multiplex data broadcasting or digital data broadcasting.

Further, in this case, a digital signature of the database 11 can be used with the public-key Kbd.

The data may be supplied without encrypting the menu in which the titles of data which can be used, the content introduction of the data, product catalogs, order forms, blank checks, the copyright information are included for the convenience of the data use.

The receiving apparatus 14 which receives the transferred public-key Kbd sends the public-key Kbd to the user terminal 18. The user terminal 18 which receives the transferred public-key Kbd stores the public key Kbd in the recording medium such as a semiconductor memory, a flexible disc, or a hard disc or the like.

Users who select the data which they request for use by means of menu or the introduction of contents request for the use of data M to the database 12 via a communication line 17 by the data communication apparatus 15.

At this time, the user encrypts the user's own secret-key Ksu by the public-key Kbd of the database 12 which has been received from the database 12:

$$Cksukbd=E(Kbd,Ksu)$$

and transmits it to the database 12.

The database 12 decrypts the encrypted secret-key Cksukbd of the user by the private-key Kvd:

$$Ksu=D(Kvd,Cksukbd)$$

and encrypts the data M which is requested for use by the decrypted user secret-key Ksu:

$$Cmksu=E(Ksu,M),$$

and transmits it to the data communication apparatus 15 of the user via the communication line 17.

The user who receives the data Cmksu encrypted by own secret-key Ksu decrypts the encrypted data Cmksu with the user terminal 18:

$$M=D(Ksu,Cmksu)$$

to use it.

This system is provided with charging center 13 which is incorporated with the database 12. Charging center 13 is used when the data is provided on pay basis. In the case where the data is one which is provided with free such as shopping information or the like, charging center 13 is not used. However, even the data provided with free such as shopping information or the like, the charging center is used in the case where charges are to be settled along with orders.

Embodiment 2

FIG. 3 shows a crypt key system according to embodiment 2 in which the present invention is applied to a video on demand (VOD) system which broadcasts television programs corresponding to the requests from users.

This system comprises a CATV station 21, a charging center 23, a receiving apparatus 24, a data communication apparatus 25 and a user terminal 28.

The charging center 23 is used when the television program is provided on pay basis but not used when the television program is provided without charges along with advertisement.

In this system, the encrypted television broadcast programs and the crypt key are transmitted through CATV line 27 which is a single path.

The CATV station 21 and the charging center 23 are connected with a direct means for electrical connection with a communication line such as a dedicated line or the like, or an indirect means such as flexible disc or the like. The CATV station 21 and the receiving apparatus 24, the CATV station 21 and the data communication apparatus 25 are connected with the CATV cable 27. The receiving apparatus 24 and the user terminal 28, the data communication apparatus 25 and the user terminal 28 are connected with a direct means such as a connection cable or an indirect means such as a flexible disc or the like.

What is shown with a solid line in FIG. 3 is an uncrypted data path and what is shown with a broken line is an encrypted data path.

Incidentally, the data exchange between the CATV station 21 and the charging center 23 is carried out through a dedicated line or a flexible disc in principle. Additionally, the data exchange is also carried out by means of a communication line or a broadcasting satellite, a communication satellite and a terrestrial wave broadcasting. In this case, the data is encrypted.

In this system, the CATV system is treated as one kind of database. As a crypt key method, the secret-key cryptosystem and the public-key cryptosystem are adopted. Users who use this VOD system either register their own public-key Kbu with the CATV station 21 in advance, or transmit the public-key Kbu by using the communication apparatus 25 at the time when the request is placed for use.

The CATV station 21 encrypts the secret-key Ksb of the CATV station 21 by the transmitted public-key Kbu of users:

$$Cksbkbu = E(Kbu, Ksb)$$

and transmits it to the data communication apparatus 25 via the CATV line 27.

The television program M is encrypted by using the secret-key Ksb of the CATV station 21

$$Cmksb = E(Ksb, M)$$

and is broadcast to the receiving apparatus 24 via the CATV line 27.

The user decrypts the received encrypted secret-key Cksbkbu of the CATV station 21 by the private-key Kvu of user:

$$Ksb = D(Kvu, Cksbkbu)$$

and decrypts the encrypted television program Cmksb using the decrypted secret-key Ksb of the decrypted CATV station 21.

$$M = D(Ksb, Cmksb)$$

for use.

In addition, this crypt key system is applicable, if encryption is available, to the television broadcasting other than CATV, audio broadcasting, or data broadcasting. As a method for transmitting the crypt key from the broadcasting station, the teletext multiplex broadcasting using the scanning lines during the retrace blanking interval of an analog television picture signal, the data broadcasting using an sub audio band of the analog television audio signal, FM multiplex data broadcasting, or digital data broadcasting can be also used.

In addition, this crypt key system can be used when the crypt key is distributed in the data copyright management system which is described in prior Japanese Patent Applications Nos. 6-64889, 6-237673, 6-264199, 6-264201 and 6-269959 proposed by the present inventor.

This crypt key system can be also applied to a case where a recording medium such as a CD-ROM or the like in which a plurality of informations are encypted with a plurality of different patterns and are recorded, which is described in Japanese Laid-Open Patent Application No. 6-132916, proposed by the present inventor.

These inventions of previous applications are explained hereinbelow.

An outline of the data copyright management system described in Japanese Patent Application No. 6-64889 is described as follows.

To control the copyright in the display (including the process to sound), storage, copy, edit and transfer of digital data in the database system including a real time transmission of a digital picture, any one or a plurality among a program for managing the copyrights, a copyright information and a copyright management message are transmitted, when needed, in addition to a permit key for allowing the use of encrypted data corresponding to use requests from users.

The copyright management message is displayed on a screen and advises or warns the user in case the data is utilized beyond the conditions of user's request or the permission. The copyright management program watches and controls in order that the data is not utilized beyond the conditions of user's request or the permission.

The copyright management program, the copyright information and the copyright management message are supplied together with a permit key in some cases, or they are supplied together with data in some other cases. Or, a part of them is supplied together with the permit key, and other part is supplied with the data.

For data, the permit key, the copyright management message, the copyright information and the copyright management program, there are the following three cases: a case where they are transmitted with encryption, and upon using, the encryption is decrypted, a case where they are transmitted with encryption and remain in encrypted except being decrypted only when they are displayed, and a case where they are not encypted at all.

An outline of the data copyright management system described in Japanese Patent Application No. 6-237673 is described as follows.

This database copyright management system comprises a database in which uncrypted data is stored, a data supply means of a broadcasting station such as satellite broadcasting station for broadcasting the encrypted data from the database, or of a recording medium such as a CD-ROM where encrypted data from the database is recorded, a communication network, a key control center for controlling a crypt key, and a copyright management center for controlling copyrights of the database. Then, the database utilization program for using the database, the copyright management program for controlling the copyrights, a first crypt key and a second crypt key are used.

A first user registers with the key control center in advance for using the database. At that time, the database use program is distributed. This database utilization program includes information on the first user and a program for generating a crypt key unique to the first user with a predetermined algorithm by using the information.

The data is stored in the database without encryption, and when it is distributed by broadcast, or through a recording medium or a communication network, the data is encrypted by the first crypt key to an encrypted data.

The encrypted data is stored in a recording medium such as a semiconductor memory of the first user terminal, a flexible disc or hard disc, when distributed via broadcasting or communication network, is preserved as is when recorded in a CD-ROM recording medium and distributed, or is stored in the recording medium such as a semiconductor memory of the first user terminal, a flexible disc or a hard disc or the like.

The first user who uses the data directly from the database requests a key for decrypting and using the encrypted data to the key control center via the communication network. Information concerning the first user is presented at this time.

The key control center transfers the information on the first user to the copyright management center while the copyright management center uses information concerning the first user to generate a crypt key unique to the first user by a predetermined algorithm, and the generated first user crypt key is used to encrypt the copyright management program, the first crypt key and the second crypt key to be transferred to the key control center.

The copyright management program encrypted by using the crypt key generated by using the information on the first user is unique to the first user.

The key control center which receives the encrypted copyright management program transmits to the first user terminal each of the encrypted copyright management program, the first crypt key and the second crypt key via the communication network. Then, the first user stores the received encrypted copyright management program, the first crypt key and second crypt key in a recording medium such as a semiconductor memory, a flexible disc, or a hard disc.

The first user generates the crypt key unique to the first user by using a database utilization program which is distributed in advance and using information on the first user with a predetermined algorithm. Then, the first user decrypts the encrypted copyright management program, the encrypted first and second crypt keys, and the encrypted data is decrypted by the decrypted first crypt key.

In the case of storing, copying and transferring the decrypted data, it is encrypted by the second crypt key decrypted with the decrypted copyright management program. Then, the encrypted data is stored in the recording medium such as the semiconductor memory of the first user terminal, the flexible disc or the hard disc or the like. When the first user uses the stored encrypted data, it is decrypted by using the second crypt key. Then, this operation is repeated for primary use of the data.

When the encrypted data is copied on the external memory medium or is transferred to the second user terminal via the communication network, the first crypt key and the second crypt key are disused by the copyright management program. The first user, then, cannot use the encrypted data.

At this time, when the encrypted data is stored in the first user terminal, uncrypted information on the first user is added to the encrypted data which is stored.

In the case where the first user uses the encrypted data again, the first user obtains the first crypt key and the second crypt key from the copyright management center. With the regrant of the first crypt key and the second crypt key, it is confirmed that the second user exists who has received the copy or the transfer of the encrypted data from the first user, and the existence of the second user is recorded on the copyright management center.

The second user who has received the copied or transferred encrypted data requests for the secondary use of the encrypted data to the copyright management center. The second user is not required to register with the key control center in advance, unlike the first user. At the time of the request for data use, with the presentation of the information of the first user from which the encrypted data has been copied or transferred to the copyright control center, the request is accepted. If the first user information is not presented at this time, the user is recognized to be the first user and not the second user who has received the copy or the transfer of the encrypted data from the first user. Thus, the request for the secondary use is not accepted.

The copyright management center which accepts the request of the secondary use transmits the second crypt key for decrypting the encrypted data, the third crypt key for reencrypting and redecrypting the decrypted data and the copyright management program for the aforementioned decryption, the reencryption and redecryption, to the second user.

The outline of the copyright management system described in the Japanese Patent Application No. 6-264199 is described as follows.

This copyright management system uses the first public-key prepared by the user, the first private-key corresponding to the first public-key, the second public-key, the second private-key corresponding to the second public-key, and the first secret-key and the second secret-key prepared by the database.

The database side encrypts the data which is not encrypted by using the first secret-key, and encrypts the first secret-key by the first public-key, and the second secret-key by the second public-key. These encrypted data and the encrypted first secret-key and second secret-key are transmitted to users.

The user decrypts the encrypted first secret-key by using the first private-key and decrypts the encrypted data by the decrypted first secret-key for use. Then, the user decrypts the encrypted second secret-key by the second private-key so that the decrypted second secret-key is used as a crypt key for data storage, copy and transfer after the decryption of the data.

The outline of the data copyright management system described in the Japanese Patent Application No. 6-264201 is described as follows.

In the case where new data is produced by editing a plurality of encrypted data which are obtained from the database and is encrypted to be supplied to others, the crypt key for a plurality of data which are original materials and edit program as editing process with a digital signature are used as a use permit key.

When the user who has received the edited and encrypted data requests for use by presenting the digital signature to the copyright management center, the copyright management center recognizes the editor on the basis of the digital signature. Only in the case where it is recognized that the editor is the authorized user of the edited data, the crypt key for use is provided to those who request for use.

The outline of a method described in the Japanese Patent Application No. 6-269959 is explained as follows.

A first user receives the encrypted data in which the original data is encrypted by the first crypt key from the database and decrypts the data at the time of use. After that, the data is encrypted by a second crypt key generated with a predetermined algorithm using one of the first crypt key, the first user data, and the data usage frequency or a combination thereof, and is stored, copied and transferred.

When the second user requests the secondary use of the data, the data copyright management center generates the second crypt key with a predetermined algorithm by using one of the first crypt key of the original data, the first user data and the data use frequency or a combination thereof to be provided to the second user.

The second user to whom the second crypt key is provided decrypts the encrypted original data by using the second crypt key for use.

Embodiment 3

The system shown in FIG. 4 is a crypt key system of embodiment 3 where the present invention is applied to the database system or the VOD system.

Like the crypt key system shown in FIG. 3 of embodiment 2, in this crypt key system, the television broadcasting programs and the crypt key pass through a single path which is the CATV line; however, these may pass through different path as well.

This system comprises a CATV station 31 for data broadcasting, a data managing center 33 such as database, a video system or the like, a receiving apparatus 34, a data communication apparatus 35 and a user terminal 38.

The data managing center 33 and the CATV station 31 are connected with a direct means for connecting with a communication line such as a dedicated line or the like or with an indirect means such as flexible disc or the like. The CATV station 31 and the receiving apparatus 34, and the CATV station 31 and the data communication apparatus 35 are connected with the CATV line 37. Incidentally, instead of the CATV line 37, a communication line which is appropriate for data broadcasting or available for data communication can be used. The receiving apparatus 34 and the user terminal 38, and the data communication apparatus 35 and the user terminal means are connected with a direct means such as a connection cable or with an indirect means such as a flexible disc.

What is shown with a solid line is an uncrypted data path in FIG. 4 and what is shown with a broken line is an encrypted data path.

The data is exchanged between the data managing center 33 and the CATV station 31 in principle with a dedicated line or a flexible disc. In addition, the data may be also exchanged with a communication line, a broadcasting satellite, a communication satellite and a terrestrial wave broadcasting. In such a case, the data is encrypted.

This crypt key system adopts the secret-key cryptosystem and a public-key cryptosystem.

The data managing center 33 prepares and supplies to the CATV broadcasting station 31 the public-key Kbd and the private-key Kvd common in all the data to be supplied and the secret-key Ksdi which is different from one data to another. The CATV station 31 encrypts the received secret-key Ksdi by using the public-key Kbd of the data managing center 33:

Cksdikbd=E(Kbd,Ksdi)

and broadcasts it by multiplex teletext broadcasting using scanning lines during the retrace line blanking interval of the analog television picture signal, the data broadcasting using a sub audio band of the analog television audio signal, FM multiplex broadcasting, or digital data broadcasting.

For convenience of the data use, menu showing rifles of available data and introduction of data outline can be also supplied without encryption to promote the use.

User who selected the desired data requests by the menu or the content introduction requests for using the data to the data managing center 33 via the CATV line 37 by using the data communication line 35 through the CATV station 31. At this time, the user transmits own public-key Kbu to the data managing center 33.

The data managing center 33 which has received the request for use from the user encrypts the data M by the secret-key Ksdi:

Cmksdi=E(Ksdi,M)

and transmits it to the user terminal 38. At that time, the private-key Kvd of the data managing center is encrypted by the public-key Kbu of the user who has requested the use:

Ckvdkbu=E(Kbu,Kvd)

to be transmitted to the user terminal 38.

The user who receives the encrypted private-key Ckvdkbu of the data managing center decrypts the encrypted private-key Ckvdkbu by the user private-key Kvu:

Kvd=D(Kvu,Ckvdkbu), decrypts the encrypted secret-key Cksdikbd by the decrypted private-key Kvd of the data managing center:

Ksdi=D(Kvd,Cksdikbd), decrypts the encrypted data Cmksdi by the decrypted secret-key Ksdi of the data managing center M=D(Ksdi,Cmksdi)

and uses it.

Embodiment 4

Since the system structure of embodiment 4 is the same as embodiment 3 shown in FIG. 4, explanation thereof will be omitted.

This system adopts the secret-key cryptosystem and the public-key cryptosystem as the crypt key system. In embodiment 3, the private-key Kvd of the data managing center is encrypted by the public-key Kbu of users who request for use while in embodiment 4, the private-key Kvd of the data managing center is distributed in advance by using the IC card or the like and stored in a user terminal. In embodiment 3 data M is distributed corresponding to the request for data use, while in embodiment 4 the data M is broadcast by means of the CATV line or the satellite broadcasting irrespective of the request for data use.

When the user subscribes a comprehensive contract for using the database with the data managing center, the private-key Kvd of the data managing center which is commonly used with all data to be supplied is in advance distributed to users by a recording medium such as an IC card or the like or a CATV line 37, and stored in the semiconductor memory of the user terminal 38, the hard disc or a flexible disc.

The data managing center 33 prepares a secret-key Ksdi different for each supplying data and a public-key Kbd, and supplies them to the CATV station 31. The CATV station 31 which receives the secret-key Ksdi encrypts the secret-key Ksdi by the public-key kbd:

Cksdikbd=E(Kbd,Ksdi)

and broadcasts it by means of teletext multiplex broadcasting using scanning lines during the retrace blanking interval of the analog television picture signal, data broadcasting using the sub audio band of the analog television audio signal, FM multiplex data broadcasting or digital data broadcasting.

At this time, for the convenience of the data use, menu showing the rifles of data which can be used, or a content introduction for explaining the data outline for promoting the data use can be also supplied without encryption.

The CATV station 31 encrypts the data M by the secret-key Ksdi:

$$Cmksdi=E(Ksdi,M)$$

and broadcasts it via the CATV line irrespective of the request for use.

The user incorporates desired data out of the data which is broadcast via the CATV line on the basis of the menu or the content introduction into the user terminal by using a receiving apparatus 34.

The user decrypts the encrypted secret-key Cksdikbd by the private-key Kvd of the data managing center which is stored in the semiconductor memory in the user terminal 38, a hard disc or a flexible disc:

$$Ksdi=D(Kvd,Cksdikbd)$$

and decrypts the encrypted data Crnksdi by the decrypted secret-key Ksdi:

$$M=D(Ksdi,Ksdikbd)$$

for use.

Other modifications of the embodiments for distributing the crypt key will be explained.

Embodiment 5

In aforementioned embodiments, the public-key Kbd of the data managing center is broadcast from the broadcasting station instead of the communication line. Thus, it is impossible to confirm whether the public-key Kbd is justified or not.

In such a case, the private-key Kvd of the data managing center is used for digital signature with the public-key kbd of the data managing center:

$$Skbdkvd=E(Kvd,Kbd)$$

to be broadcast together with the public-key Kbd of the data managing center.

The user recognizes the digital signature Skbdkvd by the received public-key Kbd of the data managing center:

$$Kbd=D(Kbd,Skbdkvd)$$

and when it is justified, uses the public-key.

Embodiment 6

In embodiment 5, in the case where the data managing center adopts the membership system for preliminarily registering the use of the database, the public-key Kbui of users who are members is also preliminarily registered with the data managing center.

The data managing center encrypts the public-key Kbd of the data managing center by the public-key Kbui of each user:

$$Ckbdkbui=E(Kbui,Kbd).$$

Digital signature is made to the public-key Kbd of the data managing center by using the private-key Kvd of the data managing center:

$$Skbdkvd=E(Kvd,Kbd).$$

Then, the encrypted public-key Ckbdkbui different from one user to another and the digital signature Skbdkvd are sent to the broadcasting station to broadcast the received encrypted public-key Ckbdkbui and the digital signature Skbdkvd.

At this time, the uncrypted user identification information of each user is broadcast by adding to the encrypted public-key Ckbdkbui if necessary.

The user who has received the broadcast encrypted public-key Ckbdkbui and the digital signature Skbdkvd decrypts the encrypted Ckbdkbui of the data managing center by the private-key Kvui:

$$Kbd=D(Kvui,Ckbdkbui)$$

and stores the decrypted public-key Kbd of the data managing center in the user terminal.

The user recognizes the digital signature Skbdkvd by the received public-key Kbd of the data managing center:

$$Kbd=D(Kbd,Skbdkvd),$$

and if it is justified, uses the stored public-key Kbd of the data managing center.

In this manner, a crypt key different from one user to another can be distributed.

Embodiment 7

Users present their own public-key Kbu to the data managing center at each time of access or request to the data managing center. The data managing center which receives the request from the user encrypts the requested data M by the public-key Kbu of the user:

$$Cmkbu=E(Kbu,M)$$

and sends it to the broadcasting station. The broadcasting station broadcasts the received encrypted data Cmkbu.

The users who receives the broadcast encrypted data Crnkbu decrypts by the private-key Kvu of the user:

$$M=D(Kvu,Cmkbu),$$

and uses it.

Figure 5A:
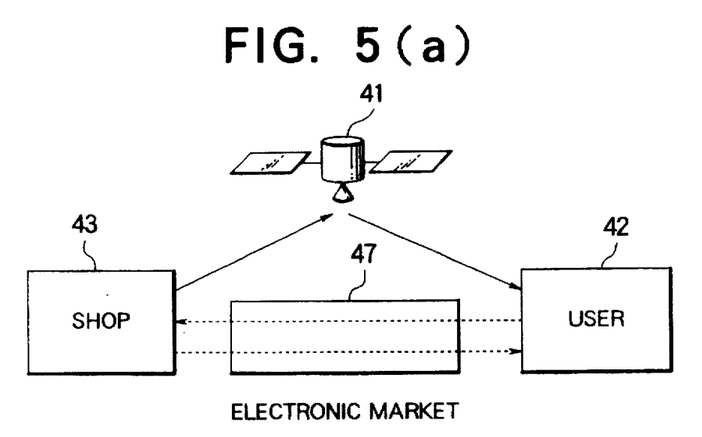
FIGS. 5(a), 5(b) and 5(c) are block diagrams of fifth embodiment according to the present invention.
Figure 5B:
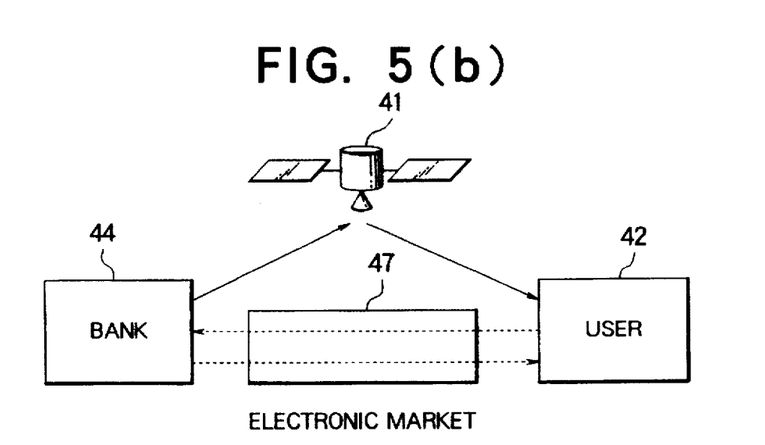
Figure 5C:
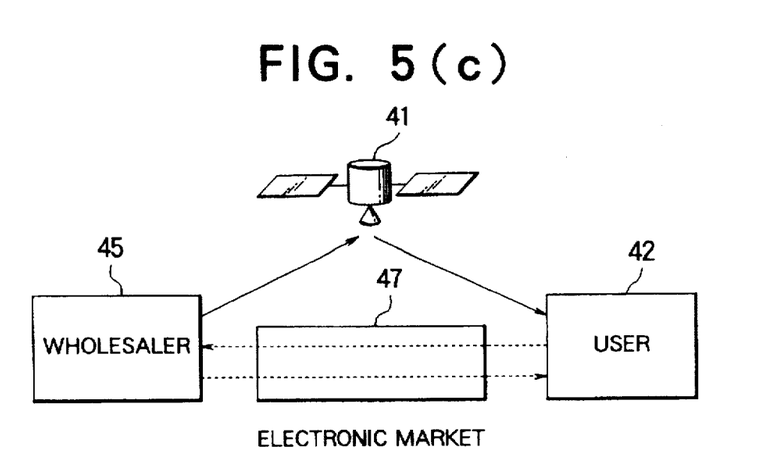

FIGS. 5(a) through 5(c) show the modified examples which use the crypt key system of the present invention.

Each example shown in the figures is an application of the crypt key system in electronic market transaction using the electronic data interchange system, to the credit settlement in retail shops shown in FIG. 5 (a); the settlement by means of an electronic check shown in FIG. 5 (b); and the whole sale conducted by makers and the like shown in FIG. 5 (c).

In these systems, a digital signature is used in addition to the secret-key cryptosystem. These systems comprise a user 42, and a retail shop 43, a financial organization 44 or a wholesaler 45 such as a maker or the like which is a World Wide Web (WWW) server on the internet.

Embodiment 8

In the credit settlement in the shop shown in FIG. 5 (a), the shop 43 broadcasts data Ms such as order form format, credit card format, advertisements, catalogs, preview, products description, and content introduction of a database, and menu, charge schedule and price list, via the satellite 41 and a CATV line.

User 42 who receives the data Ms such as order form format and a public-key Kbs of the shop 43 encrypts the user secret-key Ksu by the public-key Kbs of the shop 43:

$$Cksukbs=E(Kbs,Ksu)$$

and enters Mu items such as the order content, the payment amount and a credit card number with encryption by the secret-key Ksu of user 42 on the basis of information such as advertisement, catalog, products description and charges/prices list:

$$Cmuksu=E(Ksu,Mu),$$

when needed, compresses Mu into a compressed document mu and sign by digital signature by the private-key Kvu of the user 42:

$$Smukvu=E(Kvu,mu),$$

and transmits it to shop 43 attached with the public-key Kbu of the user 42 via the network 47.

The shop 43 which has received the order decrypts the encrypted secret-key Cksukbs of the user 42 by the private-key Kvs of the shop 43:

$$Ksu=D(Kvs,Cksukbs),$$

and decrypts the encrypted order document Cmuksu by the decrypted secret-key Ksu of the user 42:

$$Mu=D(Ksu,Cmuksu).$$

Then, order acceptance is executed.

When the digital signature Smukvu is recognized by the public-key Kbu which the user 42 attached:

$$mu=D(Kbu,Smukvu),$$

a receipt is sent to the user 42 via the network 47.

In this system, it is possible to prevent the unjustified use of the credit number because the credit card number entered in the order form is sent with encryption.

Further, the following process enables reliable transaction: The shop 43 compresses the digital data Ms1 of the order form format, the credit card format, advertisement, catalog, a preview, products description, and content introduction of the database and menu/charge schedule/price list into a compressed document ms1, with digital signature by the private-key Kvs of the shop 43:

$$Sms1kvs=E(Kvs,ms1)$$

and broadcasts it attaching the public-key Kbs of the shop 43 so that users recognize the digital signature Sms1kvs by using the public-key kbs of the shop 43:

$$ms'=D(Kbs,Smskvs).$$

Embodiment 9

In the settlement by means of electronic checks shown in FIG. 5 (b), the bank as financial organization 44 broadcasts the blank check format Mf which is digital data attached with the public-key Kbf of the bank 44 via the satellite 41 or the CATV line.

The user 42 who receives the blank check format Mf encrypts the secret-key Ksu of the user 42 by the bank public-key Kb:

$$Cksukbf=E(Kbf,Ksu),$$

enters Mu items concerning a payee and the payment amount with encryption by the secret-key Ksu of the user 42:

$$Cmksu=E(Ksu,Mu),$$

when needed, compresses Mu to the compressed document mu, and signs by digital signature by using the private-key Kvu of the user 42:

$$Smukvu=E(Kvu,mu)$$

and transmits them attaching the public-key Kbu of the user 42 and the encrypted secret-key Cksukbf of the user 42 which is encrypted by the public-key Kbf of the bank 44 to the bank 44 via the network 47.

The bank 44 which receives the described check uses the bank private-key Kvf to decrypt the encrypted secret-key Cksukbf of the user 42:

$$Ksu=D(Kvf,Cksukbf),$$

decrypts the encrypted data Cmuksu of the payee and the payment amount by the decrypted user secret-key Ksu:

$$Mu=D(Ksu,Cmuksu)$$

and recognizes the described content, and the currency exchange process is executed.

Furthermore, the bank recognizes the user 42 by Smuksu with the digital signature using the public-key Kbu added by the user 42:

$$mu'=D(Kbu,Smuksu)$$

encrypts the confirmation document Ms2 by the public-key Kbu added by the user 42:

$$Cms2kbu=E(Kbu,Ms2)$$

and sends it back to the user 42 via a network 47.

The user who receives the encrypted confirmation document Cms2kbu from the bank 44 decrypts the encrypted confirmation document Cms2kbu by the private-key Kvu of the user 42:

$$Ms2=D(Kvu,Cms2kbu)$$

and confirms the content.

According to the system, since the party to which the payment is made and the payment amount are encrypted and described in the check, it is possible to prevent the unjustified use of the content described in the check.

In addition, the blank check format Mf which is digital data is compressed into a compressed document mf and signed by digital signature by using the private-key Kvf of the bank 44:

$$Smfkvf=E(Kvf,mf)$$

to be broadcast attaching the public-key Kbf of the bank 44. The user recognizes the digital signature Smskvs by the public-key Kbs of the bank 44:

$$mf=D(Kbf,Smfkvf).$$

The confirmation document Ms is further compressed into a compressed document ms with digital signature by using the public-key Kbu added by the user:

$$Smskbu=E(Kbu,ms)$$

Thus, the bank can recognize the user who has entered on the check.

Embodiment 10

At the wholesaler 45 of a maker or the like shown in FIG. 5 (C), the wholesaler 45 forms a pro forma invoice format Mw1 into a compressed data mw1 and signs by digital signature by using the private-key Kvw of the wholesaler 45:

$$Smw1kvw=E(Kvw,mw1)$$

and broadcasts it attaching the public-key Kbw of the wholesaler 45 via the satellite 41 or CATV line.

The user 42 which is a shop receives the broadcast pro forma invoice format Mw1 and the public-key Kbw of the wholesaler 45, and encrypts the pro forma invoice request Mu by the public-key Kbw of the wholesaler 45:

$$Cmukbw=E(Kbw,Mu)$$

and transmits it to the wholesaler 45 via the network 47.

At this time, the pro forma invoice request Mu is compressed to compressed data mu when needed, and signed by the digital signature by using the private-key Kvu of the user 42:

$$Smkvu=E(Kvu,mu)$$

to be transmitted together with the public-key Kbu of the user 42 to the wholesaler 45.

The wholesaler 45 which receives the encrypted pro forma invoice request Cmukbw decrypts the encrypted pro forma invoice request Cmukbw by the private-key Kvw of the wholesaler 45:

$$Mu=D(Kvu,Cmukbw)$$

and recognizes the described pro forma invoice request Mu. Further, the wholesaler 45 recognizes the digital signature Smkvu by the public-key Kbu of the user 42:

$$mu=D(Kbu,Smkvu),$$

makes an estimate of the pro forma invoice, encrypts the pro forma invoice Mw2 by the public-key Kbu of the user 42:

$$Cmw2kbu=D(Kbu,Mw2)$$

and then, transmits it to the user 42 via the network 47.

The user 42 who receives the encrypted pro forma invoice Cmw2kbu from the wholesaler 45 decrypts it by the private-key Kvu of the user 42:

$$Mw2=D(Kvu,Cmw2kbu).$$

According to this system, since the public-key and the private-key are used, there is no fear that the content of the pro forma invoice may be stolen to be used and also different pro forma invoice can be made for each user.

In the systems shown in FIGS. 5 (a) through 5 (c), since each format and advertisement with no need of secrecy are broadcast via satellite or CATV broadcasting, the data can be effectively transmitted.

As explained above, a multimedia system can be realized which combines general information media such as television broadcasting and audio broadcasting with data communication media using computers by using the crypt key system of the present invention, while the general information media and the data communication media has been available so far as an independent system each.

A concrete structure for realizing the multimedia system will be explained as follows.

The current television broadcasting is provided by means of an analog system through terrestrial wave broadcasting, satellite broadcasting or CATV broadcasting. In the meantime, most general data communication line is a public telephone line.

In such a system structure, the crypt key system according to embodiment 1 shown in FIG. 2 can be used as a basic structure of a system for realizing a video-on-demand. The broadcasting station broadcasts the public-key Kbb by multiplexing with the sub audio band of an audio zone in the scanning line of the vertical retrace interval of an analog television broadcasting program.

Users who wish to use the television program encrypt their own secret-key Ksu by the public-key Kbb broadcast from the broadcasting station:

$$CDsukbb=E(Kbb,Ksu)$$

and request for the use by transmitting the encrypted secret-key Cksukbb to the broadcasting station via a communication line.

The broadcasting station which decrypts the encrypted secret-key Cksukbb of the users by the private-key Kvb of the broadcasting station:

$$ksu=D(Kvb,Cksukbb)$$

scrambles the broadcasting program by the decrypted secret-key Ksu and broadcasts it.

The users descramble the scrambled program for use by their own secret-key Ksu.

By adopting such a structure, persons other than those who request to use the program cannot use the program.

As a basic structure of a system for realizing the video on demand and pay-per-view in such a system structure, the crypt key system shown in embodiment 4 or embodiment 5 in FIG. 4 can be used.

The broadcasting station 31 encrypts by the secret-key Ksb of the broadcasting station 31 the public-key Kbb of the broadcasting station 31:

$$Cksbkbb=E(Kbb,Ksb)$$

and broadcasts it via the communication line 37 by multiplexing with the scanning line or a sub audio band of the retrace interval of the analog television broadcasting program.

User 38 who wishes to use the television program 38 requests for the use by transmitting own public-key Kbu to the broadcasting station 31 via the communication line 37.

The broadcasting station 31 scrambles the broadcasting program by the secret-key Ksb of the broadcasting station and broadcasts it via the communication line 37. At this time, the private-key Kvb of the broadcasting station 31 is encrypted by the public-key Kbu of user 38:

$$Ckvbkbu=E(Kbu,Kvb)$$

and is broadcast via the communication line 37.

The user 38 decrypts the encrypted private-key Ckvbkbu of the broadcasting station 31 by own private-key Kvu:

$$Kvb=D(Kvu,Ckvbkbu),$$

decrypts the encrypted secret-key Cksbkbb of the broadcasting station 31 by the private-key Kvb of the decrypted broadcasting station 31:

$$Ksb=D(Kvb,Cksbkbb)$$

and descrambles the scrambled broadcasting program by the decrypted secret-key Ksb of the broadcasting station 31.

By adopting such a structure, persons other than users who request to use the program cannot use them. Further, the crypt key system can be applied to television shopping which is frequently conducted currently by combining the television broadcasting and the telephone.

In the currently conducted television shopping which uses the analog television broadcasting, product introduction and sales method are presented on the television screen so that users record information on the sales method manually and request for the purchase thereof by a telephone on the basis of the recorded information.

On the contrary, the crypt key system according to the present invention proposes a transmission of data of the order format and the check format by multiplexing with the scanning line of the vertical retrace interval or the sub audio band of the audio zone.

In the meantime, an apparatus called personal computer television set which integrates the personal computer and the television set or an apparatus which combines a video capture device which is realized as an IC card, a PC card or an insertion board and a personal computer allows incorporation of the television picture.

With the combination of the multiplexed data such as an order format and a check format with a video capture device, an electronic television shopping can be conducted.

In such a television shopping, when the television shopping product introduction display is broadcast, the order format and the check format are broadcast in data multiplexing with the scanning line of the vertical retrace interval or the sub audio band of the audio zone.

If the users operate the apparatus when the product introduction display of the desired product to purchase is broadcast, the order format and the check format data are incorporated with the static display picture.

Users who wish to use the television shopping enters necessary items on the order format or check format to request for the purchase. To secure the safety of the transaction at this time, encryption by the public-key cryptosystem or the secret-key cryptosystem and digital signature are used with the system according to embodiments 1 to 5.

At this time, the content of transaction can be confirmed when the purchase order is requested by adding the static display picture of the product introduction together with the order and the check. As a simple method, the order form format and the check format may be also transmitted as a television picture so that necessary items are entered on the order format and the check format which are incorporated as a static display picture.

In addition, the order form format and the check format can be transmitted via facsimile broadcasting which is multiplexed with the sub audio band of the audio zone.

By adopting such a method, an electronic market using electronic data interchange (EDI) by means of a current analog television method can be realized with the television shopping.

These video-on-demand system and the pay-per-view system can be applied to the digital television broadcasting other than the analog television broadcasting.

In the case where a CATV line is used as a communication line, both the broadcasting and data communication can be carried out with the CATV line only.

Further, these video-on-demand system and pay-per-view system can be also applicable to transmission of high-quality audio data and moving picture data performed in computer communication network system using low-speed public telephone line or high-speed integrated services digital network (ISDN) or in internet system connecting a plurality of computer communication network.

As an apparatus to be used, the receiving apparatus and the communication apparatus can be incorporated in the television set. Apparatuses can be also constituted as a separate apparatus by using a set top box or the like.

It is understood that particular embodiments described herein should not limit the present invention thereby. This invention can be practiced in connection with any video capture system. For example, an apparatus referred to as a personal computer television set which is becoming prevalent or an apparatus combining a video capture device which is realized as an IC card a PC card or an insertion board for transmitting a television signal and the personal computer can be used.

Thus, a crypt key system has been described, which is applicable to a television system, a database system or an electronic data interchange.

I claim:

1. A crypt key system comprising a broadcasting station, a database, a receiving apparatus, a data communication apparatus and a user terminal, wherein said database and said broadcasting station are connected with a first communication means;

said database and said data communication apparatus are connected with a communication line;

said broadcasting station and said receiving apparatus are connected with a radio wave;

said receiving apparatus and said user terminal are connected with a second communication means;

said data communication apparatus and said user terminal are connected with a third communication means;

said database prepares a public-key and a private-key and supplies said public-key to said broadcasting station;

said broadcasting station broadcasts said received public-key;

said receiving apparatus transmits said public-key that has been received to said user terminal;

said user terminal stores said transmitted public-key;

a user encrypts a secret-key of the user by said received public-key and transmits said secret-key at the time of request for the use of data which he desires, to said database;

said database which has received the request for data use decrypts said secret-key of said user by said private-key and encrypts the data by said decrypted secret-key of said user to transmit the data to said data communication apparatus via said communication line; and said user transmits the received data to said user terminal to decrypt said data by said secret-key.

2. A crypt key system according to claim 1 wherein a digital signature of said database is provided on said public-key.

3. A crypt key system according to claim 1 wherein said first communication means is an online communication means.

4. A crypt key system according to claim 3 wherein said online communication means is a dedicated line.

5. A crypt key system according to claim 1 whereto said first communication means is an off-line communication means.

6. A crypt key system according to claim 5 wherein said off-line communication means is a flexible disc.

7. A crypt key system according to claim 1 wherein said second communication means is an online communication means.

8. A crypt key system according to claim 7 wherein said online communication means is a dedicated line.

9. A crypt key system according to claim 1 wherein said second communication means is an off-line communication means.

10. A crypt key system according to claim 9 wherein said off-line communication means is a flexible disc.

11. A crypt key system according to claim 1 wherein said third communication means is an online communication means.

12. A crypt key system according to claim 11 wherein said online communication means is a dedicated line.

13. A crypt key system according to claim 1 wherein said third communication means is an off-line communication means.

14. A crypt key system according to claim 13 wherein said off-line communication means is a flexible disc.

15. A crypt key system comprising a CATV station, a data managing center, a receiving apparatus, a data communication apparatus, and a user terminal, wherein a public-key of a user is registered with said data managing center in advance;

said data managing center encrypts a public-key of said data managing center by said public-key of each user and generates a digital signature on said encrypted public-key of said data managing center by a private-key of said data managing center;

encrypted said public-key of said data managing center and said digital signature of data managing center are sent to said CATV station;

said CATV station broadcasts received said encrypted public-key of data managing center and said digital signature;

said user decrypts said received encrypted public-key of data managing center by said private-key of said user and recognizes said digital signature by decrypted said public-key of said data managing center.

16. A crypt key system according to claim 15 wherein uncrypted user identification information of each user is further added to the encrypted public-key of said data managing center to be broadcast.

* * * * *